United States Patent [19]

Sims

[11] 4,257,247

[45] Mar. 24, 1981

[54] BOAT PROPELLOR SECURITY DEVICE

[76] Inventor: Gary F. Sims, 3518 Ridgewood Dr., St. Charles, Mo. 63301

[21] Appl. No.: 931,608

[22] Filed: Aug. 7, 1978

[51] Int. Cl.[3] .............................................. F16B 41/00

[52] U.S. Cl. .................................................. 70/232

[58] Field of Search ................. 70/232, 229, 230, 179, 70/180, 177, 178, 203, 212, 182, 183, DIG. 58, 58; 416/146 R, 146 B, 244 B

[56] References Cited

U.S. PATENT DOCUMENTS 3,732,033 5/1973 Macchi ................................ 416/244
3,759,076 9/1973 Reese .................................... 70/232
3,981,165 9/1976 Wersinger ............................. 70/232

FOREIGN PATENT DOCUMENTS 1028166 6/1976 Canada ...................................... 70/232

*Primary Examiner*—Robert L. Wolfe
*Attorney, Agent, or Firm*—Rogers, Eilers & Howell

[57] ABSTRACT

A security device for a boat propellor that is retained by a releasable lock to a propellor shaft has been developed and is disclosed as including cover means to prevent access to the releasable lock on the propellor shaft, and means for releasably retaining the cover means to the propellor to prevent unauthorized removal thereof.

10 Claims, 4 Drawing Figures

BOAT PROPELLOR SECURITY DEVICE

SUMMARY OF THE INVENTION

Inboard and outboard power motor boats all have bladed propellors that are mounted and retained on rotating propellor shafts by releasable lock mechanisms. These generally take the form of castellated nuts threaded on the propellor shaft where one of the castellated openings is arranged to receive a cotter pin, for example, that is inserted in a transverse opening provided in the shaft. Such an arrangement prevents retrograde movement of the castellated nut so as to assure positive retention of the propellor on the propellor shaft during use.

Although such arrangements prevent disassociation of the propellor and the propellor shaft during use, they also allow the power boat user to quickly and easily disassemble the propellor from the propellor shaft for repair and maintenance operations. These well known principles of operation also make it quite easy for thiefs to quickly remove and appropriate the propellor when the power boat is left unattended. Generally, it takes less than 30 seconds to remove a boat propellor.

When the boat propellor is stolen, not only is the owner faced with purchasing an expensive replacement item, but many times, the theft takes place at locations far from home where trips can be spoiled simply because there is no way a power boat can be operated without a propellor, and many power boat owners do not carry a spare propellor.

In view of these circumstances, it will be appreciated that there is need for a security device to prevent unauthorized removal of a motor boat propellor.

Accordingly, it is the principal object of the present invention to provide a security device for a boat propellor to prevent unauthorized removal thereof.

Other objects and advantages of the present invention include the provision of a boat propellor security service that is: strong and durable, capable of efficient and economical manufacture, easy to operate by the user, is long lasting, will not damage the engine if inadvertently started, and is otherwise well adapted for the purposes intended.

These and other objects and advantages are attained by the provision a boat propellor security device that includes cover means to prevent access to the releasable lock on the propellor shaft, and means for releasably retaining the cover means to the propellor to prevent unauthorized removal thereof.

DESCRIPTION OF THE PREFERRED EMBODIMENTS

It will be understood in the description that is to follow that there are differences in the size and type of metal used in boat propellors that are produced by various manufacturers; however, they all have certain features in common which have been utilized in the development of the boat propellor security device of the present invention. For example, as a common feature, each propellor has a releasable lock that retains the propellor to the propellor shaft during use, but which allows for quick and easy disassembly thereof. Also, each propellor generally is provided three propellor blades which are configured and arranged, as desired by the motor manufacturer, to propel the boat through the water in the desired fashion. Other than these common features, the size, shape, type of metal used, and certain other special features are independently chosen by the various motor manufacturers.

Accordingly, in the various embodiments of the boat propellor security device that are disclosed, it will be appreciated that different sizes and shapes may be utilized to adapt to the different sizes and shapes of the boat propellor produced by the various manufacturers, although in each instance, the basic features incorporated in the boat propellor security device of the present invention will be provided.

Figure 1:
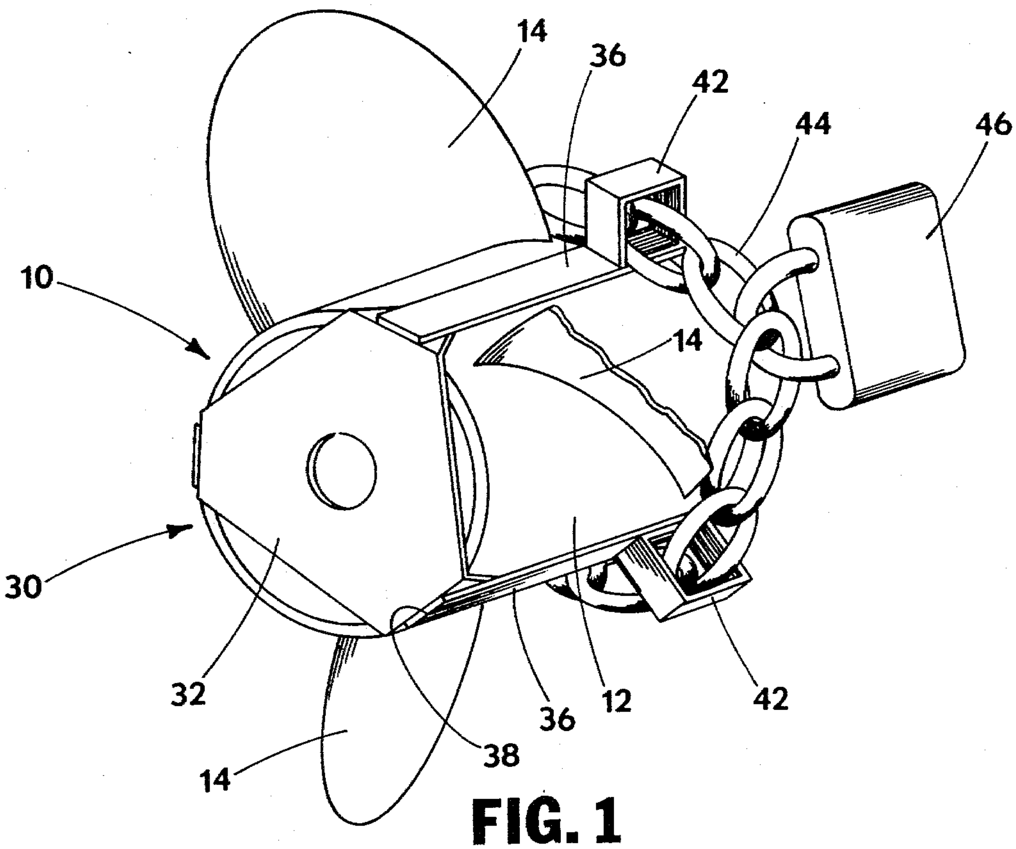
FIG. 1 is a fragmentary perspective view of a boat propellor with the security device of the present invention mounted thereon.
Figure 2:
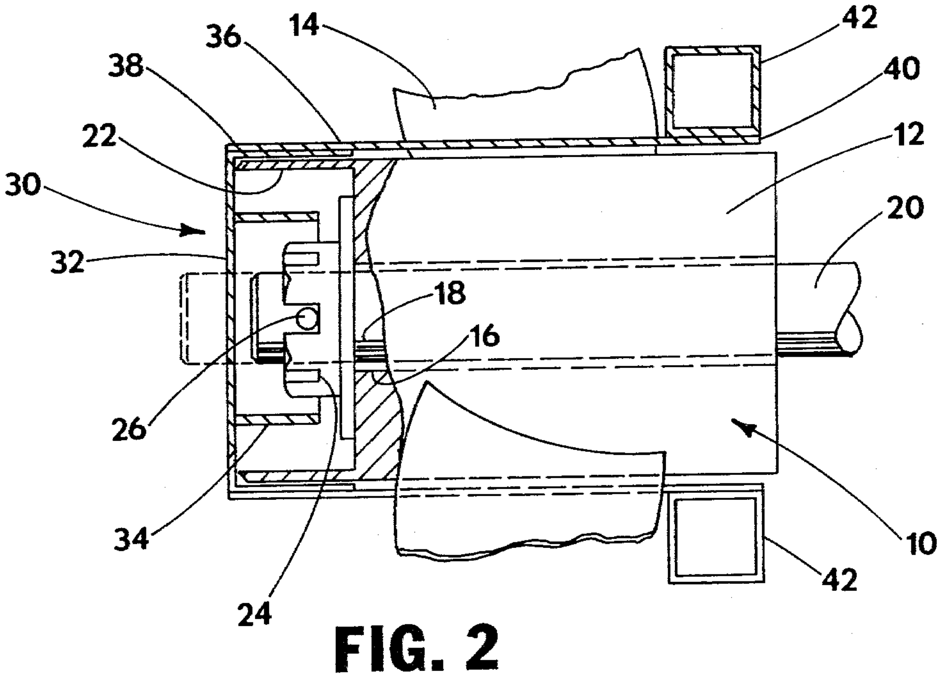
FIG. 2 is side elevational view, partly in section, of the boat propellor security device, when mounted on a boat propellor, as shown in FIG. 1.
Figure 3:
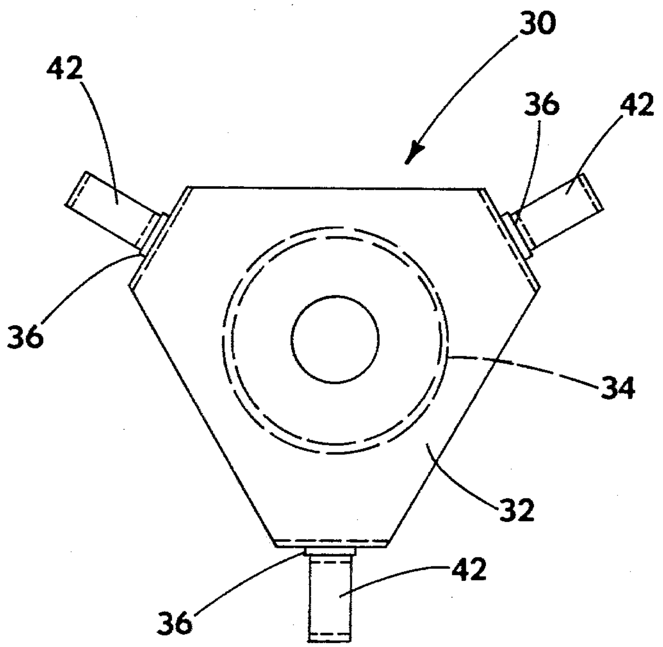
FIG. 3 is a top plan view of the boat propellor security device shown in FIGS. 1–2.
Figure 4:
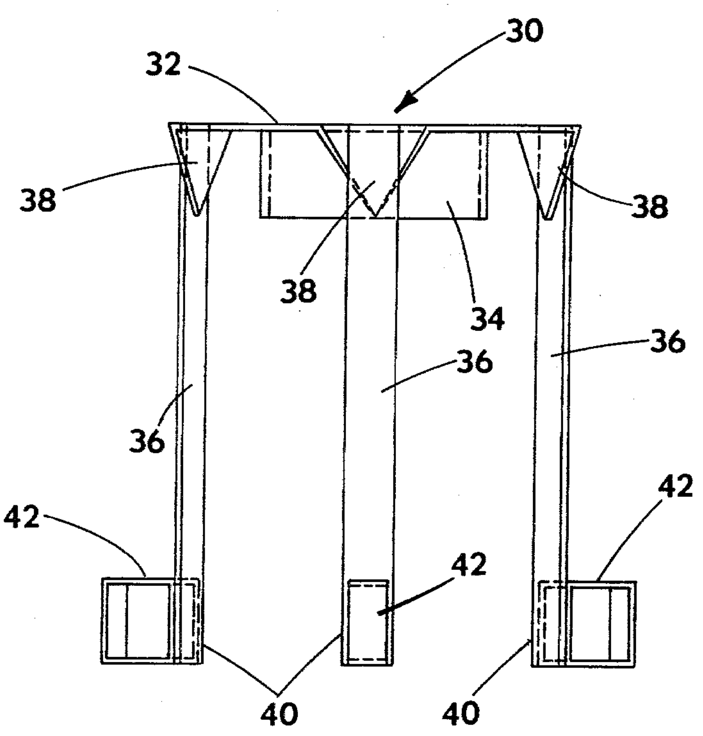
FIG. 4 is a side elevational view of the boat propellor security device shown in FIGS. 1–3.

In FIGS. 1–2 of the drawings, the boat propellor 10 is shown as including generally cylindrical housing 12 on which are integrally formed three propellor blades 14 that are configured and arranged to propel the boat associated therewith through the water. The boat propellor 10 is preferably provided with internal splines 16 in the central opening thereof which are complementary configured to external splines 18 provided on a propellor shaft 20.

In order to positively secure the propellor 10 on the propellor shaft 20, within the central end opening 22 of the propellor 10, a castellated nut 24 may be used with a cotter pin 26 extending through one of the castellated openings and into a transverse opening (not shown) formed in the propellor shaft 20. Thus, during use, the propellor 10 is positively secured on the propellor shaft 20 since the castellated nut and cotter pin combination 26, 28 respectively resist retrograde movement of the castellated nut, and thereby assures a positive assembly of the components.

At the same time, it is desirable that the propellor 10 be easily removed from the propellor shaft 20, and this can be quickly and easily accomplished by removing, from the central end opening 22 of the propellor 10, the cotter pin 24, unthreading the castellated nut 26, and then sliding the boat propellor 10 off of the propellor shaft 20. While castellated nuts and cotter pins are not used in all designs, there are similar and compatible fastening systems that facilitate ease of removal for repair and maintenance operations.

In fact, the disassembly procedure is so easy and well known, and the cost of the propellor so expensive, that it is increasingly common for boat owners to find their propellors stolen. In most cases, it takes less than 30 seconds to remove a propellor, and thus a boat owner is continuously subjected to the possibility of theft when he is not using his boat or is otherwise incapable of monitoring his boat.

According to the present invention, a boat propellor security device 30 has been developed which prevents unauthorized disassembly of the releasable lock mechanisms, such as the castellated nut and cotter pin combination 24, 26 respectively shown in the drawings, which retain the propellor 10 to the propellor shaft 20.

More specifically, the boat propellor security device 30 includes a cover means 32 which generally overlies the central end opening 22 of the propellor 10, thereby restricting access to the castellated nut and cotter pin assembly 24, 26 respectively. The cover means 32 may include, in addition to its overlying cover element, a cup element or portion 34 that is secured to the inside face of the overlying cover elememt for completely encompassing the releasable lock mechanism on the propellor shaft 20, as best seen in FIG. 2 of the drawings.

The boat propellor security device 30 further includes means for releasably retaining the cover means 30 to the propellor 10 to prevent unauthorized removal of the cover means 30. As disclosed in the drawings, this takes the form of three leg elements 36 attached at one end, as at 38, to the cover means 32 and terminating in free end portions 40 at the other end which extend slightly past the blades 14 of the propellor as best seen in FIGS. 1–2. Each of the leg means 36 are shown in FIGS. 1–4 of the drawings as being provided with enclosed foot portions 42 at the free end portions 40 thereof which are in general circumferential alignment with one another. This makes it possible for releasable retaining means in the form of a chain 44 to be threaded through the enclosed foot portions 42 with the opposite ends thereof being secured by a lock 46. The chain 44 or other suitable elongated retaining element, such as a cable, wire rope or the like, preferably snugly embraces the generally cylindrical housing 12 of the propellor 10 so as to limit access thereto by bolt cutters or heavy duty shear tools.

When locked in place, the chain 44, because it snugly embraces the generally cylindrical housing 12 immediately below the propellor blades 14, precludes upward movement of the cover means 32, thereby preventing unauthorized access to the releasable lock mechanisms associated with the propellor shaft 20. The boat owner is thereby assured that his boat propellors will not be stolen in his absence.

From the foregoing, it will be appreciated that the boat propellor security device of the present invention is a unique security protection system that is easy to operate while being extremely efficient in operation. Since there is no other system that is known or has been devised that prevents access to the releasable lock of boat propellors, the present invention meets a long felt need by a safe, economical and efficient design.

I claim:

1. A security device for a boat propellor that is retained by a releasable lock to a propellor shaft, comprising cover means to prevent access to the releasable lock on the propellor shaft, means for releasably retaining the cover means to the propellor to prevent unauthorized removal of the boat propellor including means extending from said cover means and terminating in enclosed foot sections at the free ends thereof, each of said enclosed foot portions being positioned adjacent one side of said propellor blades opposite from said cover means when said cover means is mounted in place on said propellor, and releasable retaining means extending through the enclosed foot sections to prevent unauthorized disassembly of the security device form the propellor.

2. The security device as defined in claim 1 wherein each of said leg means is configured to provide at least one opening therein to provide said enclosed foot portion.

3. The security device as defined in claim 1 wherein said releasable retaining means includes elongated strand means having the opposite free ends thereof being secured by lock means.

4. A security device for a boat propellor that is retained by a releasable lock to a propellor shaft, comprising cover means to prevent access to the releasable lock on the propellor shaft, leg means attached to said cover means which terminate in free end portions which extend slightly past the blades of the propellor, each of said leg means having openings therethrough at the free end portions thereof for receiving releasable retaining means that encircle the propellor immediately below the propellor blades, whereby unauthorized removal of the boat propellor is precluded.

5. The security device as defined in claim 4 wherein said cover means has both cover and cup portions for encompassing the releasable lock on the propellor shaft.

6. The security device as defined in claim 5 wherein there are three leg means corresponding to the three blades of the boat propellor.

7. The security device as defined in claim 6 wherein each leg means is attached to the cup portion of said cover means and is configured to extend downwardly from the cover means on the outside of the propellor.

8. The security device as defined in claim 7 wherein said releasable retaining means is configured and arranged to snugly embrace the outer surface of the propellor below the propellor blades.

9. A security device for preventing the unauthorized removal of a boat propellor from a shaft, the propellor having a central end opening wherein a releasable lock secures the propellor to the shaft, said security device including a cover means at least partially enclosing the central end opening and thereby restricting access to the releasable lock on the propellor shaft, at least two legs extending forwardly of the propellor blades, and means for extending circumferentially around the propellor and between the forward ends of said legs to prevent unauthorized removal of the security device and boat propellor.

10. The security device as defined in claim 9 wherein said cover means includes cup means for encompassing the releasable lock on the propellor shaft.

* * * * *